US008392883B2

(12) United States Patent
Hwang (10) Patent No.: US 8,392,883 B2
(45) Date of Patent: *Mar. 5, 2013

(54) INTEGRATION OF INFORMATION DISTRIBUTION SYSTEMS

(75) Inventor: Yih-Feng Hwang, Ashburn, VA (US)

(73) Assignee: Verizon Business Global LLC, Basking Ridge, NJ (US)

(*) Notice: Subject to any disclaimer, the term of this patent is extended or adjusted under 35 U.S.C. 154(b) by 547 days.

This patent is subject to a terminal disclaimer.

(21) Appl. No.: 12/722,867

(22) Filed: Mar. 12, 2010

(65) Prior Publication Data

US 2010/0169864 A1 Jul. 1, 2010

Related U.S. Application Data

(63) Continuation of application No. 10/797,068, filed on Mar. 11, 2004, now Pat. No. 7,707,548.

(60) Provisional application No. 60/488,798, filed on Jul. 22, 2003.

(51) Int. Cl.
*G06F 9/44* (2006.01)
(52) U.S. Cl. ........................................... 717/120
(58) Field of Classification Search .................. 717/120, 717/121, 104–106
See application file for complete search history.

(56) References Cited

U.S. PATENT DOCUMENTS

| | | | |
|---|---|---|---|
| 5,063,522 A * | 11/1991 | Winters | 706/10 |
| 5,963,447 A | 10/1999 | Kohn et al. | |
| 6,067,548 A | 5/2000 | Cheng | |
| 6,256,676 B1 | 7/2001 | Taylor et al. | |
| 6,389,588 B1 | 5/2002 | Wadhwa et al. | |
| 6,505,323 B1 * | 1/2003 | Lipton et al. | 716/112 |
| 6,820,118 B1 | 11/2004 | Leymann et al. | |
| 6,862,573 B2 | 3/2005 | Kendall et al. | |
| 6,910,028 B2 | 6/2005 | Chan et al. | |
| 6,990,466 B1 | 1/2006 | Hu | |
| 7,020,869 B2 | 3/2006 | Abrari et al. | |
| 7,065,729 B1 * | 6/2006 | Chapman | 716/129 |
| 7,086,009 B2 | 8/2006 | Resnick et al. | |
| 7,143,186 B2 | 11/2006 | Stewart et al. | |
| 7,152,053 B2 | 12/2006 | Serrano-Morales et al. | |
| 7,155,440 B1 | 12/2006 | Kronmiller et al. | |
| 7,177,877 B2 | 2/2007 | Nuyens et al. | |
| 7,275,237 B1 | 9/2007 | Schneider et al. | |
| 2003/0018510 A1 | 1/2003 | Sanches | |
| 2003/0084127 A1 | 5/2003 | Budhiraja et al. | |
| 2003/0172367 A1 | 9/2003 | Kannenberg | |
| 2003/0172371 A1 | 9/2003 | Offenmuller | |
| 2003/0176931 A1 | 9/2003 | Pednault et al. | |
| 2003/0177412 A1 | 9/2003 | Todd | |
| 2003/0225752 A1 | 12/2003 | Bakalash et al. | |
| 2004/0010772 A1 | 1/2004 | McKenna et al. | |
| 2004/0034830 A1 | 2/2004 | Fuchs et al. | |
| 2004/0044987 A1 | 3/2004 | Kompalli et al. | |
| 2004/0078777 A1 | 4/2004 | Bahrami | |

OTHER PUBLICATIONS

A.T. Berztiss, "Domain Analysis for Business Software Systems," *Information Systems* vol. 24, No. 7, 1999, pp. 555-568.
Yih-Feng Hwang, "Detecting Faults in Chained-Inference Rules in Information Distribution Systems," Dissertation, George Mason University, 1997; 88 pages.

(Continued)

*Primary Examiner* — Anna Deng (57) ABSTRACT

An integration component assists in the integration of information distribution systems (IDSs). The integration component may help to identify the scope of the systems that are to be integrated using a multi-level top-down approach. The multi-level top-down approach may include five levels: a system software level, a business process level, a business rule level, an interface function level, and a data level. A fault detection component may then check the identified systems to identify potential faults. This check can be performed by representing the business rules as a Transition-Directed-Graph (TDG) and then processing the TDG using generic depth-first search (DFS)-based algorithms.

20 Claims, 8 Drawing Sheets

OTHER PUBLICATIONS

Yih-Feng Hwang et al., "Graphic Algorithms to Identify Defects While Reusing Object-Oriented Software Components," 4th Joint Conference on Information Sciences, Research Triangle Park, NC, Oct. 23-28, 1998, vol. III, pp. 425-428.

Yih-Feng Hwang et al., "Algorithms to Detect Chained-Inference Faults in Information Distribution Systems," Symposium on Applied Computing (SAC 2001), Las Vegas, NV, Mar. 11-14, 2001, pp. 679-683.

Heizog et al., "Multiplatform Testbed: An Integration Platform for Multimodal Dialog Systems," May 2003, Association for Computational Linguistics, pp. 75-82.

Jiao et al., "Roccom: An Object-Oriented, Data-Centric Software Integration Framework for Multiphysics Simulations," Jun. 2003, ACM, pp. 358-367.

Ahmed et al., "Rule-Based Information Distribution Systems: Near-Optimal Rule Sets Generation," 1998, IEEE, pp. 1564-1569.

* cited by examiner

INTEGRATION OF INFORMATION DISTRIBUTION SYSTEMS

RELATED APPLICATIONS

This application is a continuation of U.S. patent application Ser. No. 10/797,068, filed Mar. 11, 2004, which claims priority under 35 U.S.C. §119 based on U.S. Provisional Application No. 60/488,798 filed Jul. 22, 2003, the disclosures of which are incorporated herein by reference in their entirety.

BACKGROUND OF THE INVENTION

A. Field of the Invention

The present invention relates generally to operations support systems (OSSs), and more particularly to switched service software systems.

B. Description of Related Art

In today's computerized world, companies may use sophisticated software systems to coordinate and manage many aspects of their business. The software systems are often highly customized to the particular needs of the company and can be a significant asset. When two competitive companies within the same business sector merge into one bigger company, reusing existing resources in each company becomes a top priority systems integration task. In particular, it is often desirable to integrate the software systems of the two companies into a single system. Such an integration can be difficult to perform, but once implemented, can provide large potential cost savings and efficiency improvements.

As an example of the above, consider the merger of two telecommunications companies. One of the valuable reusable resources for the newly consolidated company is the software systems from each company. These systematically reusable software systems keep the company business going, supports customer services, and create revenue. For the new merged company, consolidating software systems with the same functionality, such as provisioning systems and inventory systems, can provide significant benefits.

Integrating software systems, although potentially beneficial, also entails risk. The risk is because the software systems may have different data representations, business processes, business rules, and system implementations, as well as different hardware platforms that support these software systems. These factors make efficiently integrating these software systems without introducing errors or faults a difficult proposition.

Thus, there is a need in the art for techniques for integrating information distribution systems that reduce the cost and/or risk involved in such integrations.

SUMMARY OF THE INVENTION

One aspect of the invention is directed to a method of integrating software systems. The method includes identifying a scope of the integration based on a multi-level top-down approach and identifying faults in business rules that define software in the scope of the integration by applying generic depth-first search (DFS)-based techniques to the business rules. The method further includes modifying the business rules based on the identified faults.

A second aspect of the invention is directed to a system for integrating information distribution systems. The system includes means for assisting a user to identify a scope of the integration using a multi-level top-down approach, the identified scope including a set of business processes that are to be integrated and a set of business rules that define the business processes. The system further includes a fault detection component configured to identify faults in the business rules by applying generic depth-first search based techniques to the business rules.

Yet another aspect of the invention is directed to a method of integrating information distribution systems of merging entities. The method includes identifying top-level software systems that are to be integrated, identifying business processes in the top-level software systems, and comparing the identified business processes to determine business processes that are related enough to be candidates for integration. The method further includes identifying business rules that define the business processes and identifying faults in the business rules by applying generic depth-first search based techniques to the business rules.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The detailed description does not limit the invention.

As described herein, an integration component assists in the integration of information distribution systems (IDSs). The integration component may help to identify the scope of the systems that are to be integrated, such as the software systems, business processes, business rules, interface functions, and data that are to be integrated. The integration component may then check the identified systems to identify potential faults in the integrated systems. This check can be performed by representing the business rules as a Transition-Directed-Graph (TDG) and then processing the TDG using generic depth-first search (DFS)-based algorithms.

System Overview

Figure 1:
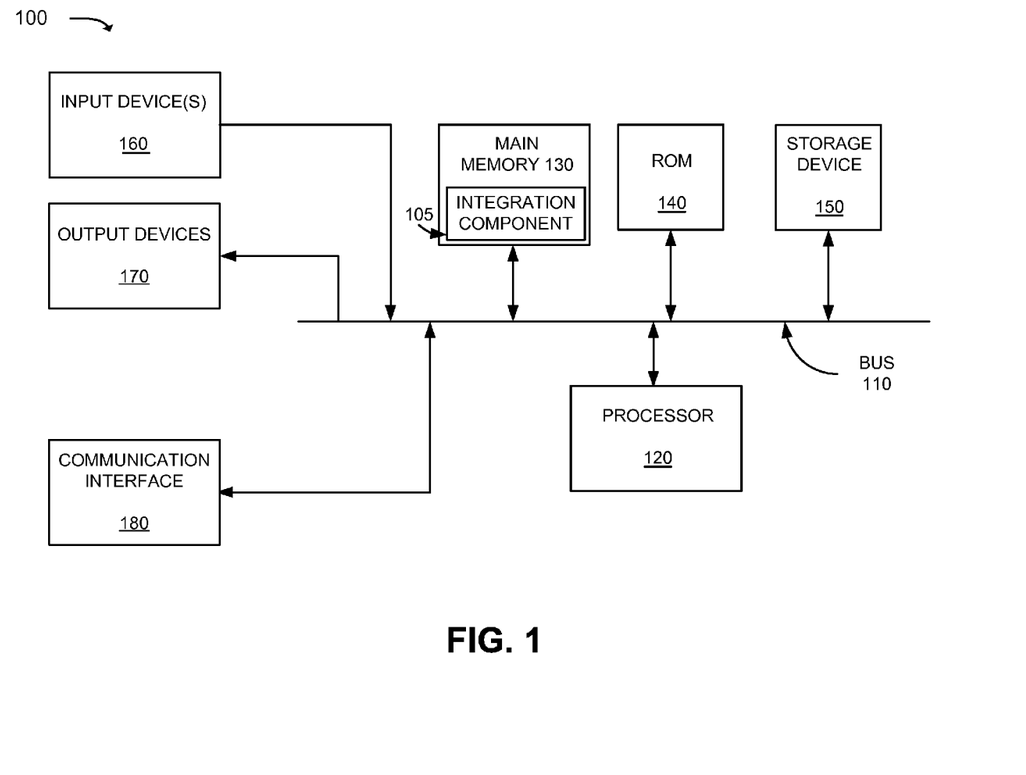
FIG. 1 is a diagram of an exemplary computing device that may be used to implement aspects of the invention.

Many of the techniques described herein are implemented on or with assistance of a computing device. FIG. 1 is a diagram of an exemplary computing device 100. Computing device 100 may include a bus 110, a processor 120, a main memory 130, a read only memory (ROM) 140, a storage device 150, input device(s) 160, one or more an output devices 170, and a communication interface 180. Bus 110 may include a set of conductors that permit communication among the components of computing device 100.

Processor 120 may include a conventional processor or microprocessor that interprets and executes instructions. Main memory 130 may include a random access memory (RAM) or another type of dynamic storage device that stores information and instructions for execution by processor 120. ROM 140 may include a conventional ROM device or another type of static storage device that stores static information and instructions for use by processor 120. Storage device 150 may include a magnetic and/or optical recording medium and its corresponding drive.

Input device(s) 160 may include conventional mechanisms that permit a user to input information to computing device 100, such as a keyboard, a mouse, a pen, voice recognition and/or biometric mechanisms, etc. Output devices 170 may include conventional mechanisms that output information to the user, including a display, a printer, a speaker, etc. Communication interface 180 may include any transceiver-like mechanism that enables computing device 100 to communicate with other devices and/or systems.

As will be described in detail below, computing device 100, consistent with principles of the invention, may implement an integration component 105. Integration component 105 may be stored in a computer-readable medium, such as memory 130. A computer-readable medium may be defined as a physical or logical memory device and/or carrier wave.

The software instructions defining integration component 105 may be read into memory 130 from another computer-readable medium, such as data storage device 150, or from another device via communication interface 180. The software instructions contained in memory 130 may cause processor 120 to perform processes that will be described later. Alternatively, hardwired circuitry or other logic may be used in place of or in combination with software instructions to implement processes consistent with the present invention. Thus, implementations consistent with the principles of the invention are not limited to any specific combination of hardware circuitry and software.

Integration Framework

Figure 2:
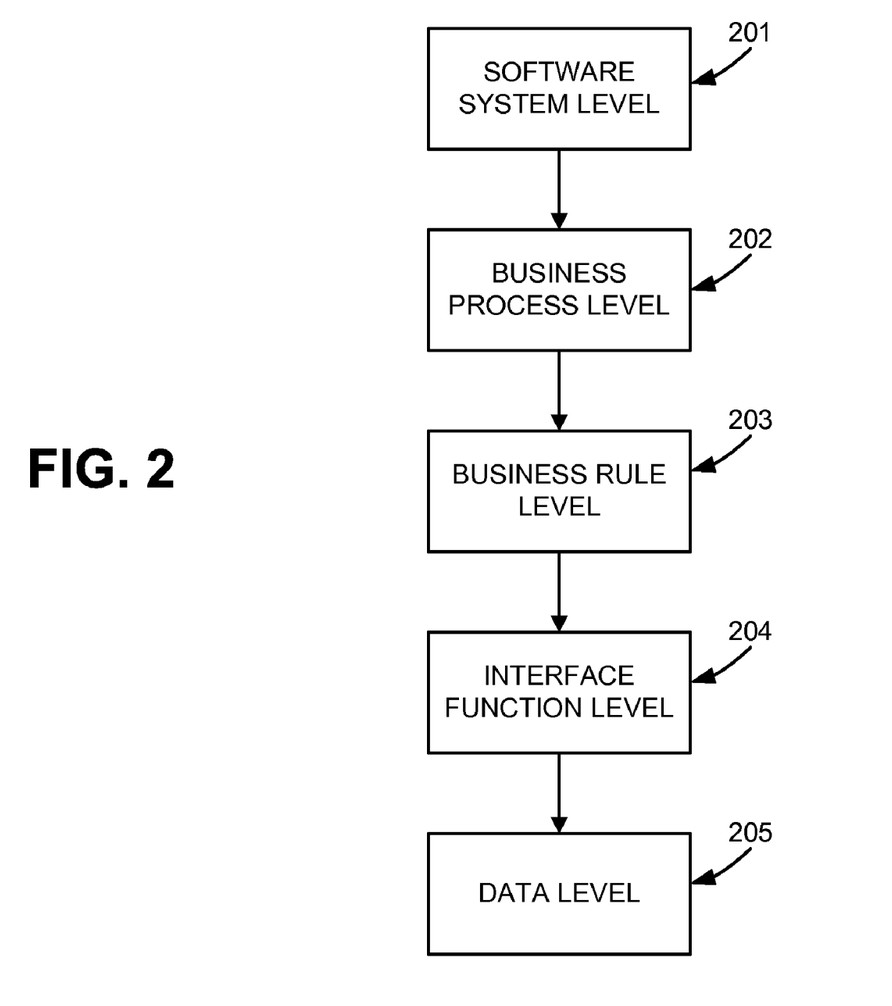
FIG. 2 is a diagram conceptually illustrating a five-level top-down integration framework that may be used consistent with aspects of the invention for integrating information distribution systems.

FIG. 2 is a diagram conceptually illustrating a five-level top-down integration framework that may be used consistent with aspects of the invention for integrating information distribution systems (IDSs). In general, software requirements for all processes that are to be integrated within the five levels are identified, to thus define the scope of the integration. This identification may be performed manually by an operator and/or with the assistance of integration component 105.

Software system level 201 may include the high-level software systems used by the two integrating parties. For example, telecommunication companies may have separate provisioning and billing software systems. These two systems would be identified as a separate system at the software system level.

Business process level 202 includes business processes, where a business process may be defined as a sequence of transitions, driven by events or data, which can be viewed as a set of chain-inference rules. In other words, a business process can be a collection of related, structured activities—a chain of events—that produce a specific business result. The result may be the creation of a product or service, or an intermediate component which contributes to the creation and delivery of products or services, either directly or indirectly. Examples of business processes may include a certain sales process, invoicing process, or marketing process.

Business processes in business process level 202 may each be defined by a set of business rules at business rule level 203. A set of business rules are employed to implement a business process. In other words, a business rule may be defined as a transition in a business process. Once a business process is identified, the business rules associated with the process can be identified and defined.

Interface function level 204 includes the interface functions that define communications between business rules. More particularly, the communications between two business rules may be defined as being performed through one or more interfaces. The interfaces include functions designed to effectuate the interfaces. The functions are employed to ensure a defined business rule is not broken during the information distribution. Once business rules are defined, functions can be documented into the integration requirements.

Data level 205 defines the data used by levels 201-204. Data integrity refers to the consistency of information stored within different information distribution systems. Data transfer across IDS/system boundaries should remain consistent in format and representation.

Figure 3:
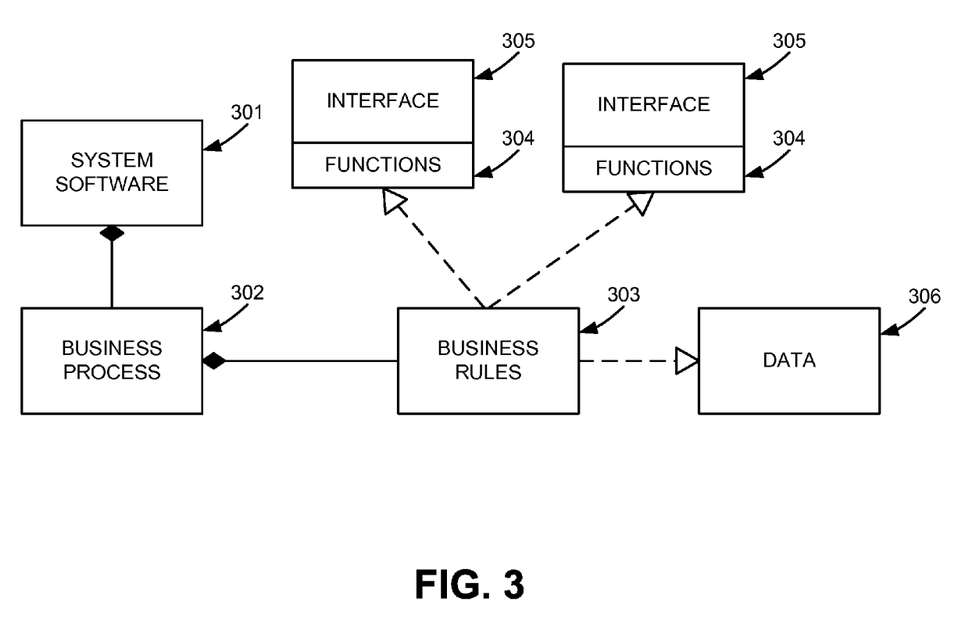
FIG. 3 is a diagram illustrating exemplary relationships between the component levels shown in FIG. 2.

FIG. 3 is a diagram illustrating exemplary relationships between the component levels 201-205 in additional detail. System software 301 may include one or more business processes 302. As mentioned, a business process 302 can be defined as a sequence of transitions, where each transition may be represented by a business rule 303. Functions 304 implement business rules 303. Functions 304 may communicate with other functions through an interface 305. Functions 304 of business rules 303 may operate on data 306.

System Operation

Figure 4:
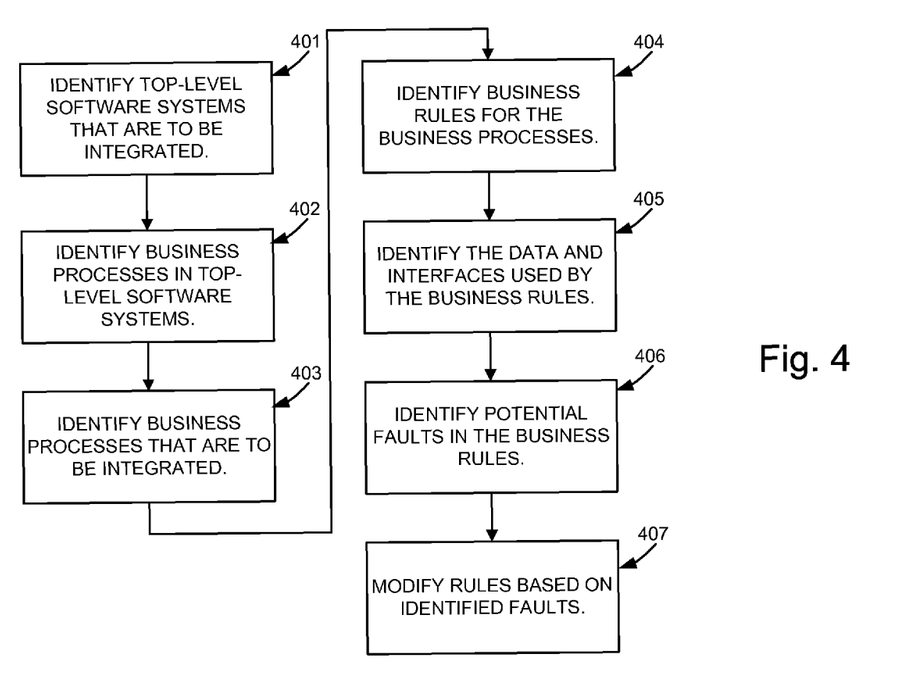
FIG. 4 is a flow chart illustrating operations for integrating two information distribution systems.

FIG. 4 is a flow chart illustrating operations for integrating two IDSs. The integration process may include identifying the different logical levels 201-205 in the two IDSs.

The operations for integrating IDSs may begin by identifying top level software systems (i.e., software systems level 201) that should be integrated (act 401). For two merging Telecommunications companies, for example, each may have software systems dedicated to communication provisioning. These provisioning systems may handle all aspects associated with identifying and activating communication services to customers.

Figure 5:
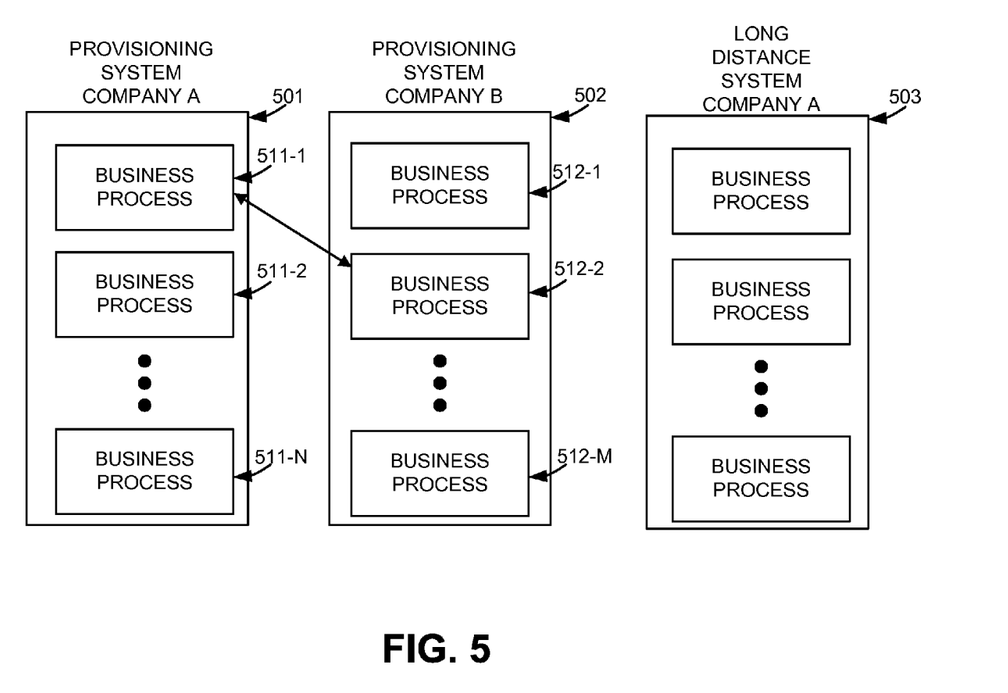
FIG. 5 is a block diagram illustrating an exemplary set of identified software systems.

As an illustrative example, FIG. 5 is a block diagram that depicts an exemplary set of software systems that may have been identified in act 401. As shown, the identified software systems include a provisioning system 501 from company "A," a provisioning system 502 from company "B," and a long distance system 503 from company "A." Provisioning systems 501 and 502 are likely to be identified as performing many common functions. Systems 501 and 502 may thus become targets for integration.

Systems targeted for integration may then be analyzed at the business process level (act 402). One or more business processes may be identified in the software systems. A number of business processes are shown in FIG. 5 for provisioning systems 501 and 502. The business processes for provisioning system 501 are labeled as business processes 511-1 thru 511-N (collectively referred to as business processes 511). The business processes for provisioning system 502 are labeled as business processes 512-1 thru 512-M (collectively referred to as business processes 512). Various ones of the business processes, such as business process 511-1 and business process 512-2, may then be identified as processes that should be integrated (act 403). Business processes that are to be integrated may be, for example, business processes that perform substantially the same or similar functions or processes that are somehow related and for which benefits could be obtained by integrating the processes. Thus, in general, business processes 511 and 512 are "compared" to locate related pairs (or potentially more than two) of business processes. For example, business processes 511-1 and 512-2 may both be processes relating to setting-up a virtual private network (VPN) connection. These two processes would be determined to be targeted for integration.

As previously mentioned, business processes may be implemented through sets of business rules. Business rules are defined for each of the identified business processes (act 404). Business rules may operate on data (e.g., customer information) exchanged through interfaces. The data and interfaces used to exchange data represent the data level 205 and interface function level 204 of an IDS. Accordingly, for each business rule, the type of data used by the rule and the interfaces through which the business rules interact may also be identified (act 405).

For each set of business processes that are to be integrated, it may be generally desirable that the integrated set of rules associated with the processes are consistent and do not interact to produce errors or other undesirable results. Potential faults in the business rules may, thus, be identified (act 406). In an exemplary aspect of the invention, an integrated set of rules may be represented using a Transition-Directed Graph (TDG) representation which may be further processed by integration component 105 using generic depth-first search (DFS)-based algorithms to identify potential faults in the rules (act 406). Based on the identified faults, the rules may be modified (act 407). The potential faults that are identified for the business rules may be based on inconsistency, contradiction, circularity, subsumption, redundancy, and incompleteness. To assist in the understanding of the invention, each of these faults will be described below. Additionally, the TDG representation and the DFS-based algorithms are generally known in the art, and are described in, for example, Y. Hwang, "Detecting Faults in Chained-Inference Rules in Information Distribution Systems," doctoral dissertation, George Mason University, Fairfax, Va., Dept. Computer Science, 1997.

Figure 6:
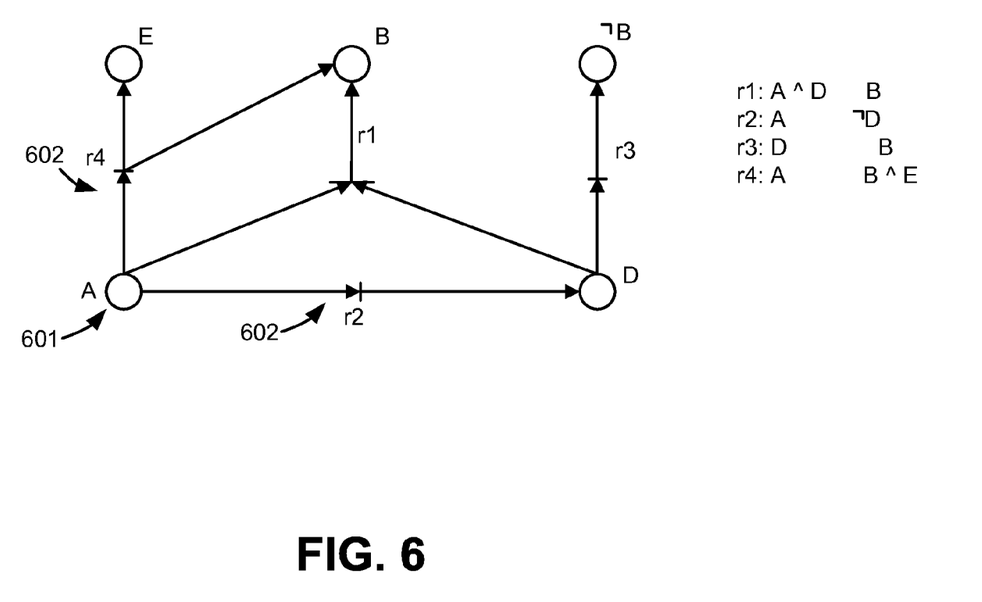
FIG. 6 is a diagram illustrating an exemplary set of rules represented using a Transition-Directed-Graph (TDG) representation.

FIG. 6 is a diagram illustrating an exemplary set of rules represented using a TDG representation. The set of rules for the TDG may represent a business process.

In FIG. 6, business rules are represented by lines and vertices. More specifically, the results of interface functions 304 are represented by vertices, such as vertex 601. Lines, such as lines 602, represent particular functions 304. A business rule may be initiated based on the occurrence of a predicate, labeled as predicates A, B, C, and D in FIG. 6.

Using the TDG representation, two or more predicates in the Right Hand Side (RHS) of one business rule are allowed. For instance, as depicted in FIG. 6, predicate A is involved in three business rules—r1, r2, and r4.

Figure 7:
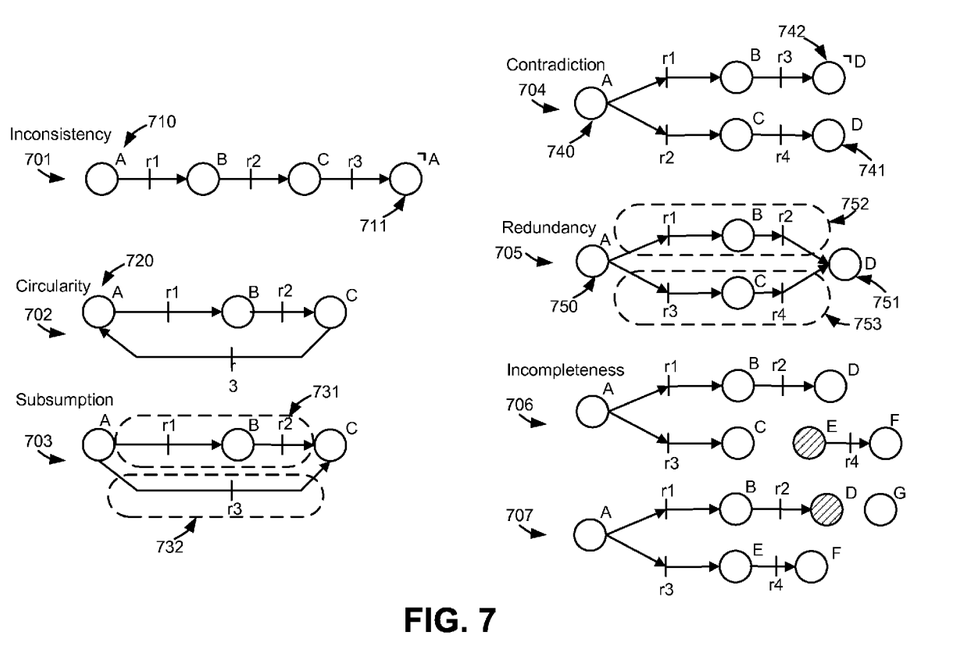
FIG. 7 is a diagram graphically illustrating six exemplary categories of chained-inference faults.

Based on the TDG representation, DFS-based algorithms can be used to identify six categories of chained-inference faults. FIG. 7 is a diagram graphically illustrating the six categories of chained-interference faults. The six categories are inconsistency 701, circularity 702, subsumption 703, contradiction 704, redundancy 705, and incompleteness 706 and 707. Each category depicts a pattern that describes a fault. Once one of fault patterns 701-707 is found, the computational complexity to locate the rules involved in the pattern is on the order of O(n), where n is the number of vertices in a given TDG.

Pattern 701, inconsistency, can be defined as a path that exists with a starting vertex that is conflicting with an ending vertex. In pattern 701, starting vertex 710 conflicts with ending vertex 711, as vertex 710 represents a predicate A and ending vertex 711 represents a predicate "not A." Pattern 702, circularity, can be defined as a path with an identical starting and ending vertex (i.e., a cycle). In pattern 702, starting vertex 720 is also the ending vertex. Pattern 705, redundancy, can be defined as a path in which a starting vertex reaches the same ending vertex along two or more paths. In pattern 705, starting vertex 750 and ending vertex 751 can both be reached by different paths 752 and 753. Pattern 704, contradiction, can be defined as a pattern that includes two paths with an identical starting vertex and contradicting ending vertices. In pattern 704, two paths begin from starting vertex 740 (predicate A) that end in contradicting predicates (predicate D and not D) at vertices 741 and 742. Pattern 703, subsumption, can be defined as a type of redundancy pattern 705, in which one of the redundant paths is a single rule. In pattern 703, paths 731 and 732 both lead to the ending vertex. Path 732 is a single rule. Patterns 706 and 707 illustrate incompleteness faults. An incompleteness fault can be defined as an internal vertex that cannot be reached from any one of the input vertices, or an internal vertex that cannot reach any of the output vertices.

The DFS-based techniques can be used to detect faults at both local and global levels at the same time. Possible criteria used to detect faults at both local and global levels will now be generally described below.

Inconsistency. During application of the DFS-based algorithm, if one vertex is active and is revisited, then pattern 701 may be considered to be found. A vertex is considered to be active if it has been visited and there exists one or more adjacent vertices that have not yet been visited.

Contradiction. During application of the DFS-based algorithm, a contradiction pattern is found when there exists an exclusive pair of vertices, such as vertices 741 and 742, and one distinguished vertex, such as vertex 740, and a path exists from vertex 740 to vertex 741 and a second path exists from vertex 740 to vertex 742.

Circularity. During application of the DFS-based algorithm, a contradiction pattern is found when a vertex is active and is revisited.

Redundancy. During application of the DFS-based algorithm, redundancy pattern 705 is found when a vertex is inactive and is revisited. A vertex is inactive if it has been visited and all its adjacent vertices have also been visited.

Subsumption. Subsumption pattern 703 is a specific type of redundancy fault in which one of the paths is a single rule.

Incompleteness. After application of the DFS-based algorithm, incompleteness patterns 706 or 707 are found based on an unvisited vertex. Also, during application of the DFS-based algorithm, incompleteness patterns 706 or 707 are found if there exists an exclusive pair of vertices such that one vertex in the pair can reach the other, or vice versa.

Figure 8:
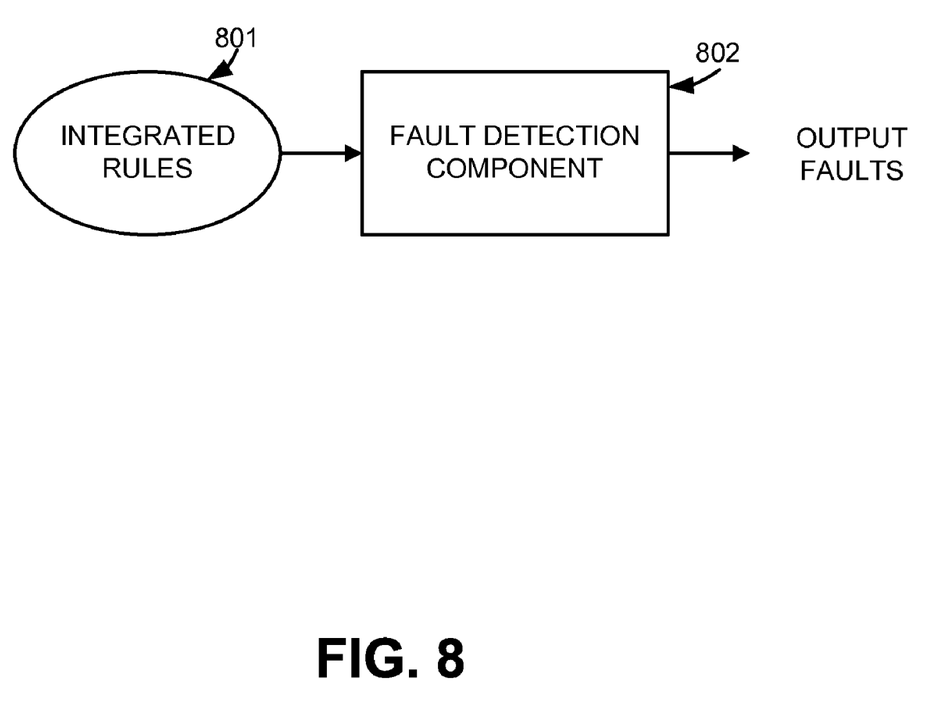
FIG. 8 is a block diagram graphically illustrating an operation shown in FIG. 4.

FIG. 8 is a block diagram graphically illustrating the operations of act 406 (FIG. 4). As shown, a set of integrated rules 801 is input to fault detection component 802. Based on the TDG representation and DFS-based algorithms, fault detection component 802 generates a list of possible faults in rules 801. Based on the identified faults, defected rules may be modified and re-input to fault detection component 802 (act 407). In this manner, rules that define business processes (which in-turn define software systems) that are to be integrated can be efficiently checked and modified to remove faults before the rules are physically implemented in software code.

CONCLUSION

Techniques were described above that can be used to integrate two or more Information Distribution Systems. Within these techniques, a five-level based approach is used to identify each component that is to be integrated. The five-level approach may first start with identifying related software systems that are to be integrated. Sets of business processes within the identified software systems may then be established. Based on the established business processes, sets of business rules can be identified. The interface functions and data that are associated with the business rules are used to ensure the business rules are not broken and that data integrity between each integrated system is held.

The TDG can be used to represent each component to be integrated during the system integration. Based on the TDG representation, six different types of faults within the integrated business rules can be verified using DFS-based algorithms. Thus, using the TDG and DFS-based algorithms, the business rules and interfaces of the business process pairs can be automatically analyzed to find faults (conflicts). Detected faults can be resolved manually or potentially using automated techniques.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the present invention is not limiting of the present invention. Thus, the operation and behavior of the aspects were described without reference to the specific software code—it being understood that a person of ordinary skill in the art would be able to design software and control hardware to implement the aspects based on the description herein.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, although many of the operations described above were described in a particular order, many of the operations are amenable to being performed simultaneously or in different orders to still achieve the same or equivalent results.

No element, act, or instruction used in the description of the present application should be construed as critical or essential to the invention unless explicitly described as such. Also, as used herein, the article "a" is intended to include one or more items. Where only one item is intended, the term "one" or similar language is used.

What is claimed:

1. A device comprising:
    a memory to store instructions; and
    a processor to execute the instructions in the memory to:
        identify a first system and a second system as systems to be integrated,
            the first system being associated with a first entity to be merged with a second entity, and
            the second system being associated with the second entity,
        identify a scope of integration of the systems based on:
            a first level that identifies the systems,
            a second level that identifies one or more processes associated with the systems, and
            a third level that identifies one or more business rules associated with the one or more processes,
        apply at least one depth-first search (DFS)-based algorithm to at least one of the one or more business rules,
        identify, based on the identified scope of integration and based on applying the at least one DFS-based algorithm, at least one fault in the at least one of the one or more business rules, and
        modify the at least one of the one or more business rules based on the identified at least one fault.

2. The device of claim 1, where the scope of integration of the systems is further based on a fourth level that identifies one or more functions relating to exchange of data associated with the one or more business rules, and
    where the processor is further to determine whether the first system and the second system are to be integrated based on at least one function, of the one or more functions, performed by the first system and the second system.

3. The device of claim 1, where the processor is further to:
    compare the one or more processes, and
    identify, based on comparing the one or more processes, similar processes, of the one or more processes, that are to be integrated.

4. The device of claim 1, where the one or more processes include business processes, and
    where the processor is further to:
        identify a business rule, of the one or more business rules, based on a business process of the business processes.

5. The device of claim 1, where the processor is further to:
    represent the at least one of the one or more business rules using a transition-directed graph (TDG) representation,
    where, when identifying the at least one fault, the processor is further to:
        identify the at least one fault based on the TDG representation.

6. The device of claim 1, where the identified at least one fault is based on at least one of:
    inconsistency associated with the at least one of the one or more business rules,
    contradiction associated with the at least one of the one or more business rules,
    circularity associated with the at least one of the one or more business rules,
    subsumption associated with the at least one of the one or more business rules,
    redundancy associated with the at least one of the one or more business rules, or
    incompleteness associated with the at least one of the one or more business rules.

7. The device of claim 1, where the systems include at least one of:
    one or more provisioning systems,
    one or more long distance systems, or
    one or more billing systems.

8. A method comprising:
    identifying, by a device, a first system and a second system as systems to be integrated,
        the first system being associated with a first entity to be merged with a second entity, and
        the second system being associated with the second entity,
    identifying, by the device, a scope of integration of the systems based on:
        a first level that identifies the systems,
        a second level that identifies one or more business processes associated with the systems, and a third level that identifies one or more business rules associated with the one or more business processes;

identifying, by the device and based on identifying the scope of integration, one or more faults in at least one of the one or more business rules using one or more depth-first search (DFS)-based algorithms; and modifying, by the device, the at least one of the one or more business rules based on the identified one or more faults.

9. The method of claim 8, where the systems include at least one of:
one or more provisioning systems,
one or more long distance systems, or
one or more billing systems.

10. The method of claim 8, further comprising:
representing the at least one of the one or more business rules, using a transition-directed graph (TDG) representation; and
identifying, using the one or more DFS-based algorithms, at least one fault, of the one or more faults, based on the TDG representation.

11. The method of claim 8, where the identified one or more faults are based on at least one of:
inconsistency associated with the at least one of the one or more business rules,
contradiction associated with the at least one of the one or more business rules,
circularity associated with the at least one of the one or more business rules,
subsumption associated with the at least one of the one or more business rules,
redundancy associated with the at least one of the one or more business rules, or
incompleteness associated with the at least one of the one or more business rules.

12. The method of claim 8, further comprising:
determining whether the first system and the second system perform similar functions of one or more functions associated with the one or more business rules; and
determining that the first system and the second system are to be integrated when the first system and the second system perform similar functions of the one or more functions.

13. The method of claim 8, further comprising:
comparing the one or more business processes; and
determining to integrate the one or more business processes, based on a result of comparing the one or more business processes.

14. The method of claim 8, further comprising:
determining that the first system and the second system are to be integrated based on one or more functions associated with the first system and the second system.

15. A non-transitory computer-readable medium storing instructions, the instructions comprising:
one or more instructions which, when executed by a processor, cause the processor to identify a first system and a second system as systems to be integrated,
the first system being associated with a first entity to be merged with a second entity, and
the second system being associated with the second entity,
one or more instructions which, when executed by the processor, cause the processor to identify a scope of integration of the systems based on:
a first level that identifies the systems,
a second level that identifies one or more business processes associated with the systems, and
a third level that identifies one or more business rules associated with the one or more business processes;
one or more instructions which, when executed by the processor, cause the processor to identify, based on the identified scope of integration, one or more faults in at least one of the one or more business rules using one or more depth-first search (DFS)-based algorithms; and
one or more instructions which, when executed by the processor, cause the processor to modify the at least one of the one or more business rules based on the identified one or more faults.

16. The non-transitory computer-readable medium of claim 15, the instructions further comprising:
one or more instructions which, when executed by the processor, cause the processor to represent the at least one of the one or more business rules, using a transition-directed graph (TDG) representation,
one or more instructions which, when executed by the processor, cause the processor to identify, using the one or more DFS-based algorithms, at least one fault, of the identified one or more faults, based on the TDG representation.

17. The non-transitory computer-readable medium of claim 15, the instructions further comprising:
one or more instructions which, when executed by the processor, cause the processor to determine that the first system and the second system are to be integrated, based on one or more functions associated with the first system and the second system.

18. The non-transitory computer-readable medium of claim 15, where the scope of integration is further based on a fourth level that identifies one or more functions associated with the one or more business rules, and
where the instructions further comprise
one or more instructions which, when executed by the processor, cause the processor to determine whether the first system and the second system perform similar functions based on the one or more functions; and
one or more instructions which, when executed by the processor, cause the processor to determine that the first system and the second system are to be integrated when the first system and the second system perform the similar functions.

19. The non-transitory computer-readable medium of claim 15, the instructions further comprising:
one or more instructions which, when executed by the processor, cause the processor to compare the one or more business processes;
one or more instructions which, when executed by the processor, cause the processor to determine that a first business process, of the one or more business processes, is related to a second business process, of the one or more business processes, based on comparing the one or more business processes; and
one or more instructions which, when executed by the processor, cause the processor to determine that the first business process and the second business process are to be integrated, based on determining that the first business process is related to the second business process.

20. The non-transitory computer-readable medium of claim 15, where the systems include at least one of:
one or more provisioning systems,
one or more long distance systems, or
one or more billing systems.

* * * * *